(12) United States Patent
Liu et al.

(10) Patent No.: US 8,652,245 B2
(45) Date of Patent: Feb. 18, 2014

(54) DUAL COLOR ELECTRONICALLY ADDRESSABLE INK

(75) Inventors: Qin Liu, Corvallis, OR (US);
Zhang-Lin Zhou, Palo Alto, CA (US);
Yaron Grinwald, Meitar (IL); Gil Bar-Haim, Holon NA (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 28 days.

(21) Appl. No.: 13/234,118

(22) Filed: Sep. 15, 2011

(65) Prior Publication Data

US 2013/0071690 A1    Mar. 21, 2013

(51) Int. Cl.
*C09D 11/00* (2006.01)
*B32B 9/04* (2006.01)

(52) U.S. Cl.
USPC .......... 106/31.27; 106/31.6; 106/31.58; 106/31.86; 428/704

(58) Field of Classification Search
USPC ........ 106/31.27, 31.6, 31.58, 31.86; 428/704
See application file for complete search history.

(56) References Cited

U.S. PATENT DOCUMENTS

| | | | |
|---|---|---|---|
| 5,047,306 A | 9/1991 | Almog | |
| 5,225,306 A | 7/1993 | Almog et al. | |
| 5,300,390 A | 4/1994 | Landa et al. | |
| 5,346,796 A | 9/1994 | Almog | |
| 5,393,635 A | 2/1995 | Russell et al. | |
| 5,554,476 A | 9/1996 | Landa et al. | |
| 6,623,902 B1 | 9/2003 | Ben-Avraham et al. | |
| 6,894,677 B2 | 5/2005 | Kazmaier et al. | |
| 6,956,690 B2 | 10/2005 | Yu et al. | |
| 7,029,818 B2 | 4/2006 | Rohr et al. | |
| 7,038,655 B2 * | 5/2006 | Herb et al. | 345/107 |
| 7,193,769 B2 | 3/2007 | Yang et al. | |
| 7,375,875 B2 | 5/2008 | Whitesides et al. | |
| 7,903,319 B2 | 3/2011 | Honeyman et al. | |
| 2002/0102487 A1 | 8/2002 | Almog | |
| 2008/0266245 A1 | 10/2008 | Wilcox et al. | |

(Continued)

FOREIGN PATENT DOCUMENTS

WO PCT/EP2010/052988    3/2010
WO WO 2010/077238    7/2010

(Continued)

OTHER PUBLICATIONS

U.S. Appl. No. 12/815,811, filed Jun. 15, 2010, Yeo et al.

(Continued)

*Primary Examiner* — Kaj K Olsen
*Assistant Examiner* — Veronica F Faison

(57) ABSTRACT

A dual color electronically addressable ink includes a non-polar carrier fluid; a first colorant of a first color; and a second colorant of a second color that is different than the first color. The first colorant includes a first particle core, and a first functional group attached to a surface of the particle core. The first functional group is capable of carrying a positive charge and is chosen from a base or a salt of the base. The second colorant includes a particle core, and a second functional group attached to a surface of the particle core. The second functional group is capable of carrying a negative charge and is chosen from an acid or a salt of the acid. The ink further includes an additive chosen from polyhydroxystearic amide salt, polyhydroxystearic acid, aromatic butyric acid, and combinations thereof.

13 Claims, 3 Drawing Sheets

(56) References Cited

U.S. PATENT DOCUMENTS

| | | | |
|---|---|---|---|
| 2008/0273237 A1 | 11/2008 | Baesjou et al. | |
| 2009/0311614 A1 | 12/2009 | Almog et al. | |
| 2010/0079358 A1 | 4/2010 | Daniel et al. | |
| 2010/0328758 A1 | 12/2010 | Sikharulidze et al. | |
| 2011/0301529 A1* | 12/2011 | Zhang et al. | 604/20 |
| 2012/0105938 A1* | 5/2012 | Liu et al. | 359/296 |
| 2012/0241695 A1* | 9/2012 | Zhou et al. | 252/519.2 |
| 2012/0287180 A1* | 11/2012 | Grinwald et al. | 345/690 |

FOREIGN PATENT DOCUMENTS

| | | |
|---|---|---|
| WO | WO 2010/077239 | 7/2010 |
| WO | WO 2011/043775 | 4/2011 |
| WO | WO 2011/046562 | 4/2011 |
| WO | WO 2011/046564 | 4/2011 |

OTHER PUBLICATIONS

Niu et al., Preparation and Characterization of Novel Yellow Pigments: Hollow TiO2 Spheres Doped With Cerium, J. Mater: Mater Electron, Published Online Apr. 21, 2011, 10 pgs.

Wen et al., Pigment-Based Tricolor Ink Particles Via Mini-Emulsion Polymerization for Chromatic Electrophoretic Displays, Journal of Materials Chemistry, 2010, 20, pp. 8112-8181.

* cited by examiner

DUAL COLOR ELECTRONICALLY ADDRESSABLE INK

BACKGROUND

The present disclosure relates generally to dual color electronically addressable inks.

Inks including charged particles (i.e., electronic inks) are widely used, for example, as additives for plastics, in electrophotographic printing, in electrophoretic displays, and in a variety of other applications. When used in electrophoretic displays, the charged colorant particles rearrange within a viewing area of the display to produce desired images in response to an applied electric field. Many electronic inks include negatively charged particles or positively charged particles. These mono-color inks may be utilized in layered stacks (e.g., up to four layers) in order to provide a multi-color or full color display.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
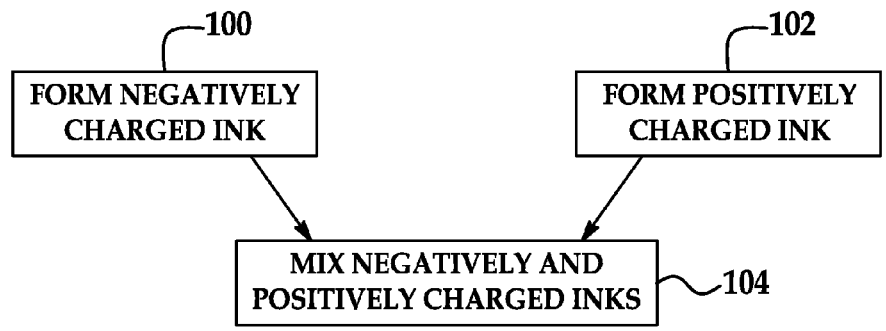
FIG. 1 is a flow diagram illustrating an example of a method for forming an example of a dual color electronically addressable ink.

In the following detailed description, directional terminology, such as "top," "bottom," "front," "back," etc., is used with reference to the orientation of the Figure(s) being described. Components of examples of the present disclosure can be positioned in a number of different orientations, and thus the directional terminology is used for purposes of illustration and is in no way limiting. It is to be understood that other examples may be utilized and structural or logical changes may be made without departing from the scope of the present disclosure. As used herein, the term "over" is not limited to any particular orientation and can include above, below, next to, adjacent to, and/or on. In addition, the term "over" can encompass intervening components between a first component and a second component where the first component is "over" the second component. Also as used herein, the term "adjacent" is not limited to any particular orientation and can include above, below, next to, and/or on. In addition, the term "adjacent" can encompass intervening components between a first component and a second component where the first component is "adjacent" to the second component.

Examples of the dual color electronically addressable ink disclosed herein include a mixture of a functionalized first colorant that is capable of carrying a positive charge, a functionalized second colorant that is capable of carrying a negative charge, and one or more additives. The polarity of charging in the dual color ink may be due to the interaction between the functionalized colorants and/or between the additive(s) and/or between the functionalized colorants and the additive(s). As such, the functionalized colorants themselves may or may not be charged. For example, it is believed that, in some instances, the interaction of a charge director additive with a specific colloid (e.g., the functionalized colorant(s) disclosed herein) may cause negative or positive charging based upon acid-base interaction. In some instances, it is believed that the addition of the charge director additive(s) induce the majority of the charges. The ink also exhibits binary electronic activity. More particularly, the colorants disclosed herein may be selectively controlled (e.g., compacted or spread) to show either color on demand, which may be particularly useful for a full-color reflective electrophoretic/kinetic display. The inks disclosed herein may be suitable for use in a variety of other applications as well, including other display and printing applications (e.g., digital printing applications, such as electrophotography and liquid electrophotography), electronic skins, jetting on blanket applications, ion beam printing applications, or other printing applications.

Since the electrically addressable ink may be subjected to electrophoretic/kinetic actuation, it is desirable that the selected colorants exhibit dispersibility and desirable charge properties in the selected non-polar carrier fluid (described below). Two differently colored colorants may be selected. It is to be understood that any desirable combination of colors may be utilized, as long as one of the colorants can be functionalized with a base or its salt so that the functionalized colorant is capable of carrying a positive charge and the other of the colorants can be functionalized with an acid or its salt so that the functionalized colorant is capable of carrying a negative charge. Examples of the different colors that may be selected for a single electrically addressable ink include magenta and black, cyan and yellow, magenta and cyan, orange and blue, red and white, green and white, blue and white, yellow and white, or any other combinations of colors.

The two differently colored colorants each have a particle core. The particle cores may be selected from organic pigments, inorganic pigments, or polymer particles colored with dye molecules or pigments, which are self-dispersible or non-self-dispersible in the non-polar carrier fluid. When non-self-dispersible colorants are used, the ink also includes one or more suitable dispersants. The additives described hereinbelow may function as dispersants, and thus additional dispersants may or may not be included. When it is desirable to include additional dispersants, the following examples may be utilizes: hyperdispersants such as those of the SOLSPERSE® series manufactured by Lubrizol Corp., Wickliffe, Ohio (e.g., SOLSPERSE® 3000, SOLSPERSE® 8000, SOLSPERSE® 9000, SOLSPERSE® 11200, SOLSPERSE® 13840, SOLSPERSE® 13940, SOLSPERSE® 16000, SOLSPERSE® 17000, SOLSPERSE® 18000, SOLSPERSE® 19000, SOLSPERSE® 21000, and SOLSPERSE® 27000); various dispersants manufactured by BYK-chemie, Gmbh, Germany, (e.g., DISPERBYK® 110 (solution of a copolymer with acidic groups), DISPERBYK® 163 and DISPERBYK® 170 (solutions of a high molecular weight block copolymer with pigment affinic groups), and DISPERBYK® 180 (alkylolammonium salt of a copolymer with acidic groups); various dispersants manufactured by Evonik Industries AG, Germany, (e.g., Tego® Dispers 630 (solution of high molecular weight polycarboxylic acid with an amine derivative), Tego® Dispers 650, Tego® Dispers 651 and Tego® Dispers 655 (modified polyethers with groups of high pigment affinity), Tego® Dispers 685 (high molecular weight polymer), and Tego® Phobe 1000 (elumsion of a polymethyl-phenyl silicone resin); and various dispersants manufactured by Sigma-Aldrich, St. Louis, Mo., (e.g., sorbitans such as SPAN® 20, SPAN® 60, SPAN® 80, and SPAN® 85).

It is to be understood that some examples of the particle core may have acid or base groups (apart from the functional groups attached to or associated therewith) that participate in the charging process that takes place within the dual color ink.

A suitable inorganic black pigment includes carbon black. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, REGAL® 660R, MOGUL® L, MONARCH® 700, MONARCH® 800, MONARCH® 880, MONARCH® 900, MONARCH® 1000, MONARCH® 1100, MONARCH® 1300, and MONARCH® 1400); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX®U, PRINTEX® V, PRINTEX® 140U, Special Black 5, Special Black 4A, and Special Black 4). An example of an organic black pigment includes aniline black, such as C.I. Pigment Black 1.

Some examples of suitable yellow pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, and C.I. Pigment Yellow 180.

Examples of suitable magenta or red organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of cyan organic pigments include C.I. Pigment Blue 1, C.I. Pigment Blue 2, C.I. Pigment Blue 3, C.I. Pigment Blue 15, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Suitable examples of green organic pigments include C.I. Pigment Green 1, C.I. Pigment Green 2, C.I. Pigment Green, 4, C.I. Pigment Green 7, C.I. Pigment Green 8, C.I. Pigment Green 10, C.I. Pigment Green 36, and C.I. Pigment Green 45. Suitable examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66. Suitable examples of white pigments include titanium dioxides, $TiO_2$—$SiO_2$ core-shell white particles, calcium carbonate particles, $CaCO_3$—$SiO_2$ core-shell white particles, ceramic white particles, white clay particles, or other white particles.

The core colorant particles may have an average particle size ranging from about 10 nm to about 10 μm. In some instances, the average particle core size ranges from about 10 nm to about 1 μm, or from about 50 nm to about 1 μm.

The colorants are surface modified to attach to or associate with groups that are capable of carrying positive charges or negative charges. As used herein, the functional groups on or associated with the positively charged colorant particles include those functional groups that are capable of undergoing a reaction that introduces the positive charge on the functional group. These functional groups may be in base form or in salt form, and the colorants having/associated with such functional groups may be referred to herein as base/base salt functionalized colorants. Examples of suitable groups that can carry a positive charge include trialkyamines, pyridines, substituted pyridines, imidazoles, substituted imidazoles, and $R_1R_2N$— (where $R_1$ and $R_2$ are each independently selected from a hydrogen group, a methyl group, an ethyl group, a propyl group, an isopropyl group, a butyl group, an iso-butyl group, an n-octyl group, an n-decyl group, an n-dodecyl group, an n-tetradecyl group), and combinations thereof. Also as used herein, the functional groups on or associated with the negatively charged colorant particles include those functional groups that are capable of undergoing a reaction that introduces the negative charge on the functional group. These functional groups may be in acid form or in salt form, and the colorants having/associated with such functional groups may be referred to herein as acid/acid salt functionalized colorants. Examples of suitable groups that can carry a negative charge include a carboxyl group (COOH), dithoic acid (CSSH), a thiocarboxyl group (COSH), sulfonic acid ($SO_3H$), phosphonic acid ($PO_3H$), sulfuric acid ($OSO_3H$), phosphoric acid ($OPO_3H$), and combinations thereof. It is believed that hydroxyl groups (OH) and thiol groups (SH) may be utilized as acid functional groups that can carry a negative charge, although these may be considered relatively weak acids.

In some instances and as mentioned above, at least some of the groups capable of carrying a positive charge may be basic salts, and/or that at least some of the groups capable of carrying a negative charge may be acidic salts. Salts of any of the previously listed functional groups in the base form and salts of any of the previously listed functional groups in the acid form may be used.

The selected colorants may not include the desired functional groups, and thus may undergo a suitable reaction in order to introduce on the surface of the colorants (e.g., via chemical bonding), or associated with the surface of the colorants (e.g., via physical association), the desired functional groups. The base/base salt and acid/acid salt modified colorants may be formed via any suitable reaction. As examples, basic surface modification may be accomplished with a silane reagent (e.g., trialkylamine functionalized triethoxysilane), and acidic surface modification may be accomplished with a diazonium salt (e.g., phosphoric acidic propylbenzene diazonium salt, carboxylic acidic propylbenzene diazonium salt, etc.) or a silane reagent (e.g., phosphoric acid functionalized triethoxysilane). It is believed, however, that the surface modification processes may be accomplished using any of the acid/acid salt or base/base salt functional groups disclosed herein. As an example, the selected colorant may be mixed with a suitable surface modifying reagent in, e.g., water, ethanol, etc. The mixture may then be stirred for a time that is sufficient to enable the reaction to occur. Then the mixture may be extracted, and the surface modified colorants may be dried or added to a non-polar medium.

Alternatively, the selected colorants may have the desirable functional groups on their surfaces when purchased. These already functionalized colorants may be used as-purchased or may have to be extracted from the dispersion in which they are sold. For example, base/base salt or acid/acid salt functionalized colorants may be present in an aqueous dispersion, and may be extracted from the aqueous dispersion for use in the dual color inks disclosed herein. As an example, an aqueous dispersion including pigments with sulfonic acid groups and/or sulfonate groups may be purchased (e.g., a cyan aqueous dispersion from Cabot Corp., Billerica, Mass.). The acid/acid salt group surface modified pigments may be extracted from the aqueous dispersion by diluting the aqueous dispersion with water and mixing the diluted dispersion. The diluted mixture may then be centrifuged to obtain supernatant and sediment. The supernatant may then be separated from the sediment. If desirable, the dilution and centrifugation may be repeated multiple times. After the sediment is collected, water may be added and mixed with the sediment. The mixture may be freeze dried, and once dried, the solids may be ground to form acid/acid salt group surface modified pigments suitable for use in the examples of the dual color ink disclosed herein. It is believed that this extraction process may be performed using any aqueous dispersion including base/base salt or acid/acid salt functionalized colorants.

Once the desired base/base salt functionalized colorants and acid/acid salt functionalized colorants are selected and/or obtained, the dual color ink may be formed. In an example of forming the dual color ink, a negatively charged ink and a positively charged ink may be formed separately, and then these inks may be mixed together. This example method is shown and described in reference to FIG. 1. In another example of forming the dual color ink, the colorants and additive(s) may be added to a non-polar carrier fluid simultaneously. This example method is shown and described in reference to FIG. 2.

Referring now to FIG. 1, the negatively charged ink is formed (reference numeral 100), and the positively charged ink is formed (reference numeral 102).

The negatively charged ink may be formed by mixing acid/acid salt functionalized colorants (described hereinabove) and additive(s) into a non-polar carrier fluid. The positively charged ink may be formed by mixing base/base salt functionalized colorants (described hereinabove) and additive(s) into the same kind of non-polar carrier fluid used for the negatively charged ink. The acid/acid salt functionalized colorants and additive(s) or the base/base salt functionalized colorants and additive(s) may be added simultaneously or sequentially to the respective carrier fluids.

In an example, the non-polar carrier fluid has a resistivity in excess of about 109 ohm-cm and a dielectric constant k below 5. Such fluids tend to reduce leakages of electric current when driving a display including the ultimately formed dual color ink, as well as increase the electric field present in the fluid when a voltage is applied thereto. In an example, the non-polar carrier fluid is an isotropic solvent. Examples of suitable non-polar carrier fluids include hydrocarbons, halogenated or partially halogenated hydrocarbons, functionalized hydrocarbons (where functionalization can be accomplished using esters, ethers, sulfonic acids, sulfonic acid esters, and the like), oxygenated fluids, siloxanes, silicon oils, long chain alcohols and acids (e.g., linoleic acid, dodecanol, etc.), organic solvents (e.g., styrenes, naphthalenes, etc.), and/or natural oils (e.g., cotton seed oil, olive oil, soya (i.e., soybean oil), etc.). When hydrocarbons are utilized, the hydrocarbon may be an aliphatic hydrocarbon, an isomerized aliphatic hydrocarbon, a branched chain aliphatic hydrocarbon, an aromatic hydrocarbon, or combinations thereof. In some examples, the carrier fluids include isoparaffinic compounds, paraffinic compounds, dearomatized hydrocarbon compounds, and the like. Specific examples of suitable carriers for the dual color ink include ISOPAR®-G, ISOPAR®-15 H, ISOPAR®-L, ISOPAR®-M, ISOPAR®-K, ISOPAR®-V, NORPAR® 12, NORPAR® 13, NORPAR® 15, EXXSOL® D40, EXXSOL® D80, EXXSOL® D100, EXXSOL® D130, and EXXSOL® D140 (available from Exxon Mobil Corp.); Teclen N-16™, Teclen N-20™, Teclen N-22™, Nisseki Naphthesol L™, Nisseki Naphthesol M™, Nisseki Naphthesol H™, Solvent L™, Solvent M™, Solvent H™ Nisseki Isosol 300™, Nisseki Isosol 400™, AF-4™, AF-5™, AF-6™ and AF-7™ (available from Nippon Oil Corp.); IP Solvent 1620™ and IP Solvent 2028™ (available from Idemitsu Kosan); Electron™, Positron™, and New II™ (available from Ecolink); perchloroethylene; halocarbons (such as halocarbon 0.8, halocarbon 1.8, halocarbon 4.2, and halocarbon 6.3); cyclohexane; dodecane; mineral oil; siloxanes (e.g., cyclopentasiloxane and cyclohexasiloxane); and combinations thereof. In some examples, each of the negatively charged ink and the positively charged ink includes the carrier fluid in an amount ranging from about 15 wt % to about 99 wt % by total weight of the respective ink composition. The amount of carrier fluid in the resulting dual ink depends upon how much of each of the negatively charged ink and the positively charged ink is utilized.

The additive(s) that may be included in the negatively and positively charged inks include polyhydroxystearic amide salt, polyhydroxystearic acid, aromatic butyric acid, or combinations thereof. Some examples include a single one of these additives. Other examples include a mixture of one or more of the previously listed additives. Still other examples include a mixture of one or more of the previously listed additives plus polyisobutylene succinimide (e.g., OLOA® 1200, OLOA® 11000, or other OLOA® compounds from Chevron Oronite and LUB 6406 from Lubrizol) as an additional additive. The additives disclosed herein may function as a dispersant and/or a charge director/charge adjuvant.

Charge director(s) are components that induce and/or increase the charge on the respective colorant particles. The charge directors can physically associate with the base/base salt functionalized colorants and/or the acid/acid salt functionalized colorants. The selected charge director(s) may form a micelle (or a reverse micelle) structure physically associated, but not chemically associated, by hydrophobic bonding with the colorants to provide at least part of the particle charge. Hydrophobic bonding or, more appropriately, hydrophobic interaction represents a well-known phenomenon that occurs in micellular structures. Essentially, a reverse micelle forms in the non-polar carrier fluid when the hydrophilic heads of the amphiphilic molecules orient the molecules so as to assemble the hydrophilic heads together inside the micelle with hydrophobic tails assembled outside at the micelle surface. The charge director forms a reverse micelle structure that physically associates by hydrophobic bonding with the colorant particles to provide at least part of the particle charge. Hydrophobic bonding is also well-known, and does not infer chemical bonding, but rather an attractive physical interaction between hydrophobic portions of molecules and a nonpolarized material, such as the functionalized colorant surface.

Depending upon the charge director additive(s) that is/are selected, the reverse micelle that is formed may be a positively charged micelle or a negatively charged micelle. Some charge directors are capable of forming positively charged micelles, negatively charged micelles, or both the positively charged micelles and the negatively charged micelles. As such, some charge directors are capable of associating with the base/base salt functionalized colorants (introducing and/or enhancing the positive charge), some other charge directors are capable of associating with the acid/acid salt functionalized colorants (introducing and/or enhancing the negative charge), and still some other charge directors are capable of associating with both the base/base salt functionalized colorants or the acid/acid salt functionalized colorants (introducing and/or enhancing both the positive and negative charges).

It has been found that when formulating the negatively charged ink and positively charged ink separately; some of the same additive(s) may be used. As such, the negatively charged ink and the positively charged ink may include some of the same components and some different components. In these examples, the additive(s) that are the same advantageously introduce and/or enhance the respective charges within each of the oppositely charged inks. For example, each of the negatively charged ink and the positively charged ink may include i) a mixture of polyisobutylene succinimide and polyhydroxystearic amide salt; or ii) a mixture of polyisobutylene succinimide, polyhydroxystearic acid, and aromatic butyric acid.

As shown at reference numeral 104 in FIG. 1, once the negatively charged and positively charged inks are formed, at least some of each of the inks are mixed together to form the dual color ink disclosed herein. In an example, the negatively charged ink and the positively charged ink may be added together in a ratio of 1:1. It is believed, however, that other suitable ratios may be utilized.

When formulating the negatively charged ink and the positively charged ink separately, it is desirable that the dual color ink formed via the mixture of the two oppositely charged inks include from about 0.1 wt % to about 20 wt % (based upon the total wt % of the dual color ink) of each of the base/base salt and acid/acid salt functionalized colorants, from about 0.1 wt % to about 20 wt % (based upon the total wt % of the dual color ink) of the additive(s), and a balance of the non-polar carrier fluid. In another example, the total amount of additive(s) ranges from about 3 wt % to about 11 wt %. As such, the amounts of colorant and additive(s) used in each of the negatively charged ink and the positively charged ink will depend, at least in part, on the desired amount in the resulting dual color ink.

Figure 2:
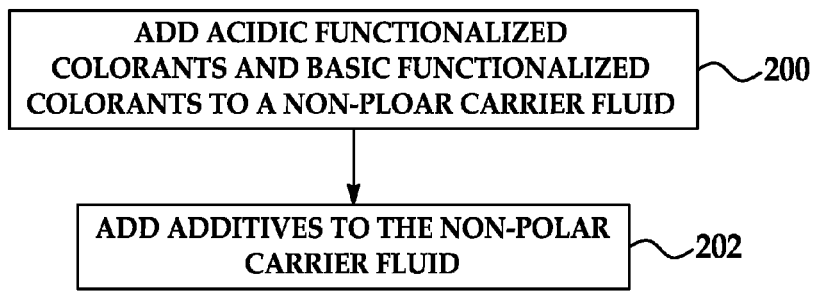
FIG. 2 is a flow diagram illustrating another example of a method for forming an example of the dual color electronically addressable ink.

Referring now to FIG. 2, the base/base salt functionalized colorants and the acid/acid salt functionalized colorants are added to the non-polar carrier fluid (reference numeral 200) before, after, or while the additive(s) are added to the non-polar carrier fluid (reference numeral 202). In the example shown in FIG. 2, the dual color ink is formed without first forming separate positively and negatively charged inks.

In this example of the method, the non-polar carrier fluid previously described in reference to FIG. 1 may be used. In some examples, the dual color ink includes the carrier fluid in an amount ranging from about 10 wt % to about 99 wt % by total weight of the dual color ink composition.

The desirable base/base salt functionalized colorants and acid/acid salt functionalized colorants are selected and/or formulated (as described above), and are added to the non-polar carrier fluid simultaneously or sequentially. In the example shown in FIG. 2, the amount of base/base salt functionalized colorants used ranges from about 0.1 wt % to about 20 wt % (based upon the total wt % of the dual color ink), and the amount of acid/acid salt functionalized colorants used ranges from about 0.1 wt % to about 20 wt % (based upon the total wt % of the dual color ink).

As mentioned above, in the method shown in FIG. 2, the additive(s) selected may be added before, after, or while the two colorants are added to the non-polar carrier fluid. In an example, the total amount of the additive(s) added to the dual color ink ranges from about 0.1 wt % to about 20 wt % (based upon the total wt % of the dual color ink). In an example dual color ink formulation, the following additives may be utilized: i) polyisobutylene succinimide present in an amount ranging from about 0.1 wt % to about 10 wt % of the total wt % of the ink; ii) polyhydroxystearic amide salt present in an amount ranging from about 0.1 wt % to about 10 wt % of the total wt % of the ink; iii) polyhydroxystearic acid present in an amount ranging from about 0.1 wt % to about 10 wt % of the total wt % of the ink; and iv) aromatic butyric acid present in an amount ranging from 0 wt % to about 10 wt % of the total wt % of the ink. The amount of additive(s) selected may depend, at least in part, on the colorant combination that is selected. In an example dual color ink formulation utilizing, for example, magenta for the first colorant and cyan for the second colorant, the following additives may be utilized: i)

polyisobutylene succinimide present in an amount ranging from about 0.5 wt % to about 2.0 wt % of the total wt % of the ink; ii) polyhydroxystearic amide salt present in an amount ranging from about 1.0 wt % to about 3.5 wt % of the total wt % of the ink; iii) polyhydroxystearic acid present in an amount ranging from about 1.5 wt % to about 4.5 wt % of the total wt % of the ink; and iv) aromatic butyric acid present in an amount ranging from 0 wt % to about 1 wt % of the total wt % of the ink.

Table 1 provides examples of suitable dual color ink formulations made via either the method shown in FIG. 1 or the method shown in FIG. 2. In the table, "AF" means acid/acid salt functionalized, "BF" means base/base salt functionalized, "PS" is polyisobutylene succinimide, "PAS" is polyhydroxystearic amide salt, "PA" is polyhydroxystearic acid, "ABA" is aromatic butyric acid, and "NPCF" is non-polar carrier fluid. As noted in the Table 1, some examples do not include aromatic butyric acid. All percentages represent the weight percent.

TABLE 1

| Example | AF Colorant | BF Colorant | PS | PAS | PA | ABA | NPCF |
|---|---|---|---|---|---|---|---|
| 1 | 1 | 2.5 | 0.63 | 1.5 | 2 | 0 | Balance to 100% |
| 2 | 1 | 2.25 | 0.75 | 1.5 | 2.5 | 0 | Balance to 100% |
| 3 | 1 | 2 | 0.75 | 1.5 | 2.5 | 0 | Balance to 100% |
| 4 | 1 | 4 | 0.75 | 1.5 | 4 | 0 | Balance to 100% |
| 5 | 1 | 4 | 0.75 | 1.5 | 4 | 0.5 | Balance to 100% |
| 6 | 1 | 4 | 1.25 | 1.5 | 4 | 0 | Balance to 100% |
| 7 | 1 | 4 | 1.25 | 1.5 | 4 | 0.5 | Balance to 100% |
| 8 | 2 | 4 | 1 | 3 | 4 | 0.5 | Balance to 100% |
| 9 | 2 | 4 | 1.5 | 3 | 4 | 0.5 | Balance to 100% |
| 10 | 2 | 4 | 1 | 2 | 4 | 0.5 | Balance to 100% |
| 11 | 2 | 4 | 1.5 | 2 | 4 | 0.5 | Balance to 100% |

Examples of the dual color ink may include no other additives, except for those previously mentioned. Other examples of the dual color ink disclosed herein may also include other additives, such as other charge adjuvants. Examples of other suitable additives includes 2-(4-Chlorophenyl)-3-methylbutyric acid; 2-(4-Chloro-3-fluorophenyl)-3-methylbutyric acid; 2-(4-Chlorophenyl)-3-trifluoromethylbutyric acid; 2-(4-Chloro-3-fluorophenyl)-3-trifluoromethylbutyric acid; 2-(3,4-Dichlorophenyl)-3-methylbutyric acid; 2-(3,4-Dichlorophenyl)-3-methylbutyric acid; 2-(3,4-Dichlorophenyl)-3-trifluoromethylbutyric acid; 2-(3,4-Dichlorophenyl)-3-trifluoromethylbutyric acid; 2-(4-Chloro-2-methylphenyl)-3-methylbutyric acid; 2-(4-Chloro-2-methylphenyl)-3-methylbutyric acid; 2-(4-Chloro-2-methylphenyl)-3-trifluoromethylbutyric acid; 2-(4-Chloro-2-methylphenyl)-3-trifluoromethylbutyric acid; 2-(4-Chloro-3-methylphenyl)-3-methylbutyric acid; 2-(4-Chloro-3-methylphenyl)-3-methylbutyric acid; 2-(4-Chloro-3-methylphenyl)-3-trifluoromethylbutyric acid; 2-(4-Chloro-3-methylphenyl)-3-trifluoromethylbutyric acid; 2-(4-Chloro-3-methoxyphenyl)-3-methylbutyric acid; 2-(4-Chloro-3-methoxyphenyl)-3-methylbutyric acid; 2-(4-Chloro-3-methoxyphenyl)-3-trifluoromethylbutyric acid; 2-(4-Chloro-3-methoxyphenyl)-3-trifluoromethylbutyric acid; 2-(2,4-Dichlorophenyl)-3-methylbutyric acid; 2-(2,4-Dichlorophenyl)-3-methylbutyric acid; 2-(2,4-Dichlorophenyl)-3-trifluoromethylbutyric acid; 2-(2,4-Dichlorophenyl)-3-trifluoromethylbutyric acid; and combinations thereof.

The selection of functionalized colorants and additive(s) provides the ability to control the charge of the dual color ink disclosed herein. This control enables one to formulate the ink to have specific electronic activity in defined conditions. High levels of charging can be achieved, which results in high switching speed (e.g., >300 ms) when the ink is used, for example, in a display device. In one example, the dual color electronically addressable ink is used in a pixelated display. Each pixel of the display may include the dual color ink (i.e., condensed color in each pixel), which enhances the color depth and simplifies the display design.

Some suitable displays for use with the dual color ink disclosed herein are discussed in U.S. patent application Ser. No. 12/815,811, entitled "Display Element", filed Jun. 15, 2010. Examples of the display and its various components, including the dual color electronic ink disclosed herein, are described in reference to FIGS. 3- and 7.

Figure 3:
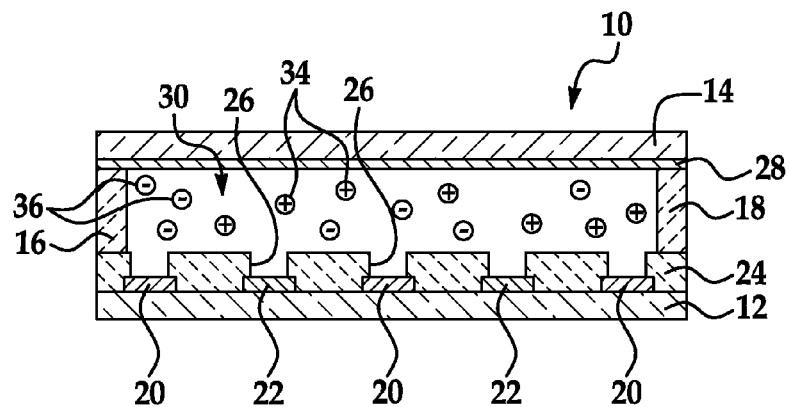
FIG. 3 is a cross-sectional view of an example of a display pixel including an example of a dual color electronically addressable ink.

Referring now to FIG. 3, a cross-sectional view of one pixel 10 of a display is illustrated. The display includes transparent substrates 12, 14. Examples of suitable transparent substrate materials include plastic (e.g., polyethylene terephthalate (PET), polyethersulfone (PES), polyethylene naphthalate (PEN), etc.)), glass, or other suitable optically clear/transparent materials. The transparent substrates 12, 14 are separated by an electrically insulating material that is designed/configured such that it defines side walls 16, 18 of the different pixels 10 of the display.

Each pixel 10 includes interdigitated electrodes 20, 22. The first electrode 20 includes a plurality of conductive lines $L_{20}$ that are interdigitated with the plurality of conductive lines $L_{22}$ of the second electrode 22. Examples of suitable materials for the interdigitated electrodes 20, 22 include any suitable conductor, such as a metal, silver nanowires, carbon nanotubes, or transparent conductors (e.g., indium tin oxide (ITO)).

Figure 5:
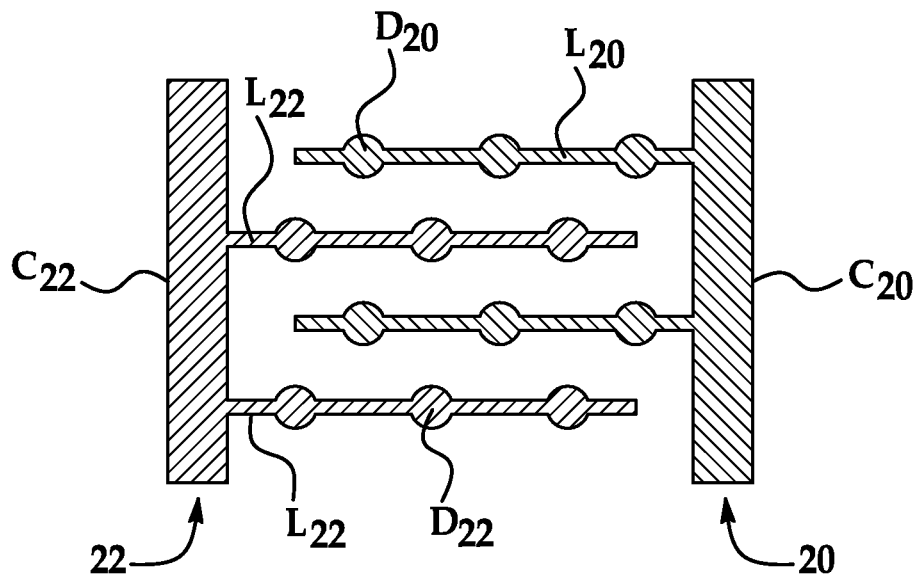
FIG. 5 is a top view of an example of interdigitated electrodes that may be used in examples of the displays disclosed herein.

A top view of one example of the interdigitated electrodes 20, 22 is shown in FIG. 5. Each electrode 20, 22 includes the respective conductive lines $L_{20}$, $L_{22}$ coupled to a respective common contact region $C_{20}$, $C_{22}$. In this example, the conductive lines $L_{20}$, $L_{22}$ include dot regions $D_{20}$, $D_{22}$ separated by portions of the lines $L_{20}$, $L_{22}$. It is to be understood however, that the dot regions $D_{20}$, $D_{22}$ may be excluded. As illustrated, the common contact region $C_{20}$ is parallel and opposite to common contact region $C_{22}$. The conductive lines $L_{20}$, $L_{22}$ are interdigitated. In this example, the respective dot regions $D_{20}$, $D_{22}$ of adjacent conductive lines $L_{20}$, $L_{22}$ are aligned with one another, while the dot regions $D_{20}$ of conductive lines $L_{20}$ are offset from dot regions $D_{22}$ of conductive lines $L_{22}$. In other examples, the dot regions $D_{20}$ of conductive lines $L_{20}$ are aligned with dot regions $D_{22}$ of conductive lines $L_{22}$. The common contact region $C_{20}$ and conductive lines $L_{20}$ are used to control the movement of either acid/acid salt functionalized or base/base salt functionalized colorants of the dual color ink, and the common contact region $C_{22}$ and conductive lines $L_{22}$ are used to control the movement of the other of base/base salt functionalized or acid/acid salt functionalized colorants of the dual color ink.

While a square lattice is shown, it is to be understood that the electrodes 20, 22 may be configured as a hexagonal lattice. Any other lattice geometry can be used so long as the geometry meets the clear aperture requirement and controls electrokinetic flow of the charged colorants for desirable electronic ink performance. It is to be understood that the electrode 20, 22 geometries may be optimized for a given electroconvective principle to provide switching and compaction for both colorants of the dual color ink.

Referring back to FIG. 3, the interdigitated electrodes 20, 22 are formed on the substrate 12. A dielectric layer 24 is formed over the electrodes 20, 22, and recesses 26 are formed so that surfaces of each of the electrodes 20, 22 are exposed. The recess 26 pattern may, in one example, correspond with the dot regions $D_{20}$, $D_{22}$ of the electrodes 20, 22. The recesses 23 allow the charged base/base salt functionalized colorants (shown with a "+" and as reference numeral 34) or acid/acid salt functionalized colorants (shown with a "−" and as reference numeral 36) to compact therein in response to a suitable bias being applied to the electrodes 20 and 28 or 22 and 28. As shown in FIG. 3, the dielectric layer 24 may be patterned so that the electrodes 20 and 22 are exposed at each of the recesses 26. Examples of materials suitable for the dielectric layer 24 include some UV curable resins, photoimagable resins, other plastics, and various oxides (e.g., hafnium oxide, $HfO_2$).

In another example that is not shown, the dielectric layer 24 may be patterned to be thin enough at each of the recesses 26 so that the recesses 26 are electrically active. In other words, a thin portion of the dielectric layer 24 remains in the recesses 26 so long as the electrodes 20 and 22 are electrically coupled to the dual color ink (present in the display cell 30) at the recesses 26. In this example, the thicker portion of the dielectric layer 24 (i.e., where recesses 26 are not formed) acts as an insulator between the electrodes 20 and 22 and the dual color ink.

The display pixel 10 also includes a blanket electrode 28 established adjacent to the substrate 14. This electrode 28 may be transparent. Examples of suitable transparent electrode materials include single wall or multi-wall carbon nanotube layers, silver nanowires, transparent conducting oxides (such as ITO (Indium Tin Oxide)), or transparent conducting polymers (such as PEDOT (poly 3,4-ethylenedioxythiophene) or polyethylenedioxythiophene:polystyrenesulfonate (PEDOT:PSS)), or combinations thereof. Examples of these combinations include hybrid transparent electrodes, such as metal/polymer transparent electrodes, gold/ITO transparent electrodes, silver/ITO transparent electrodes, diamond/metal transparent electrodes, metal/dielectric transparent electrodes (e.g., LiF/Al), or the like. The electrode 28 is a grounded or reference electrode that operates in conjunction with the electrode 20 to move one of the colorants (e.g., the base/base salt functionalized colorants) in the dual color ink, and that operates in conjunction with the electrode 22 to move the other of the colorants (e.g., the acid/acid salt functionalized colorants) in the dual color ink. The operation of the electrodes 20, 22 and 28 will be described further hereinbelow.

The area defined between the electrodes 20, 22 and 28 and the pixel walls 16, 18 is a display cell 30 that contains an example of the dual color ink disclosed herein.

Figure 4:
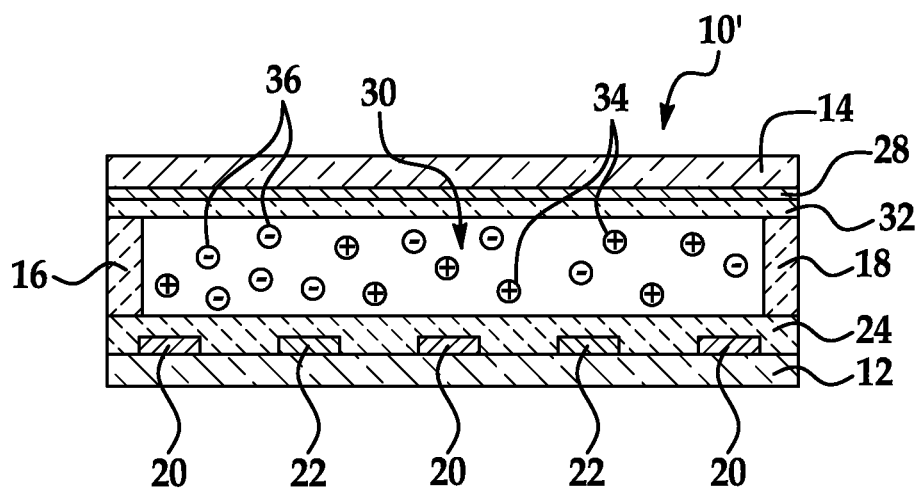
FIG. 4 is a cross-sectional view of another example of a display pixel including an example of a dual color electronically addressable ink.

FIG. 4 illustrates another example of the display pixel 10'. This example is similar to the example shown in FIG. 3, except that the dielectric layer 24 is established over the substrate 12 and the electrodes 20, 22, and a passivation layer 32 is positioned on the electrode 28 adjacent to the display cell 30.

The example of the dielectric layer 24 shown in FIG. 4 does not include recesses 56, but rather is thin enough over the electrodes 20, 22 to render the areas adjacent to the electrodes 20, 22 electrically active.

This example of the display pixel 10' also includes an additional passivation layer 32 positioned in contact with the electrode 28 and adjacent to the display cell 30. The passivation layer 32 may be any electrically insulating material that insulates the electrode 28 from the dual color ink in the display cell 30. In one example, the passivation layer 32 is a dielectric material, such as $HfO_2$. Other suitable passivation layer materials include reflective dielectric materials or optically clear or transparent dielectric materials.

Example dimensions of the components of the display pixel 10' shown in FIG. 4 include: about 100 nm for the passivation layer 32, the electrode 28, the substrates 12, 14 and the dielectric layer 22; 60 μm or smaller for the height of the display cell 30; about 10 μm for the overall width of the interdigitated electrodes 20, 22 (i.e., from one end to the other with all of the lines $L_{20}$, $L_{22}$ in between); from about 0.5 μm to about 1.5 μm for the width of each individual line $L_{20}$, $L_{22}$; and about 10 μm for the width of the pixel walls 16, 18. It is to be understood that these dimensions are illustrative and other dimensions may be used. For example, the overall width of the interdigitated electrodes 20, 22 and the width of the individual lines $L_{20}$, $L_{22}$ may be a few microns or less (e.g., in the sub-micron range). The dimensions may vary depending, at least in part, on the desired size of the pixel 10' and the desired size of the entire display. Furthermore, the figures illustrate exaggerated lines $L_{20}$, $L_{22}$ for understanding, but it is to be understood that the lines $L_{20}$, $L_{22}$ are generally much thinner than the gap between adjacent lines $L_{20}$, $L_{22}$ in order to provide good clear aperture and transparency.

In still other examples of the display pixel (not shown), a dielectric layer may be positioned between the substrate 12 and the interdigitated electrodes 20, 22. This dielectric layer may be made up of any suitable dielectric material previously discussed.

When a pixelated display includes multiple rows and columns of pixels, suitable addressing circuitry may be operatively connected in order to desirably address the electrodes 20, 22. In an example, the electrode 20 of each pixel 10, 10' is electrically connected to respective first color data lines, respective first color control lines, and transistors or switches. Similarly, the electrode 22 of each pixel 10, 10' is electrically connected to respective second color data lines, respective second color control lines, and transistors or switches. In one example, all of the data lines and control lines are conductive lines. In one example, all of the transistors or switches are thin film transistors. As previously mentioned, the conductive lines $L_{20}$, $L_{22}$ of the first and second electrode 20, 22 are interdigitated, where the conductive lines $L_{20}$, $L_{22}$ are independently operable to control the movement of different colorants 34, 36. Each electrode 20 (and its conductive lines $L_{20}$) is individually activated through a respective transistor or switch based on signals applied to corresponding first data lines and first control lines. Each electrode 22 (and its conductive lines $L_{22}$) is individually activated through a respective transistor or switch based on signals applied to corresponding second data lines and second control lines. In this manner, each individual colorant 34, 36 of each individual pixel 10, 10' of the display can be controlled to provide a desired image.

The dual color ink within the display cell 30 of a pixel 10, 10' may be operated in various states. Control of the base/base salt functionalized or acid/acid salt functionalized colorants 34, 36 is given by a relative potential difference between the blanket electrode 28 and the respective electrodes 20, 22.

To achieve a fully spread state, where neither the base/base salt functionalized nor the acid/acid salt functionalized colorants 34, 36 are compacted near the electrodes 20, 22, no bias may be applied. However, it can take some time to achieve the desired fully spread state with no bias. In another example, the spread state can be achieved when pulses are applied to first and second electrodes 20, 22 relative to a reference bias applied to electrode 28. The pulses may be used to control the spreading of the colorants 34, 36 and to accelerate the process. The pulses applied to first electrode 20 spread negatively charged acid/acid salt functionalized colorants 36 within display cell 30. The pulses applied to second electrode 22 spread positively charged base/base salt functionalized colorants 34 within display cell 30.

When the colorants 34, 36 are subtractive colorant particles and are spread in display cell 30, a black state or a combined subtractive color state may be achieved. For example, when cyan and yellow particles are spread (and a white reflector is used), the display will appear green since red and blue colors are subtracted out. The amount of colorants 34 and/or 36 that are in the spread state can be controlled by either dynamic modulation of voltage pulse width at fixed amplitude, or dynamic modulation of voltage pulse amplitude at fixed pulse width, or both. Symmetric pulsing between attractive and repulsive potential allows uniform mixing while asymmetric pulsing between more attractive potential than repulsive will attract more colorants 34 and/or 36 in the compacted state, thus providing gray scale (described further below). Since two colorants 34, 36 are included, it is to be understood that there are enough degrees of freedom with three electrodes 20, 22, 28 to control each of the colorants 34, 36 independently. In one example to achieve the fully spread state, the electrode 28 may be held at 0V, while pulses of +20V and −20V are applied to electrode 20 and pulses of −20 V and +20 volts are applied to electrode 22.

As previously mentioned, the grey scale of the colorants 34 and/or 36 may be achieved by compacting some of the colorants 34 and/or 36 while spreading others of the colorants 34 and/or 36. It is to be understood that the amount of spreading of acid/acid salt functionalized colorants 36 may be controlled based on the pulses to provide a desired gray scale for the colorants 36. Similarly, the amount of spreading of base/base salt functionalized colorants 34 may also be controlled based on the pulses to provide a desired gray scale for the colorants 34. In order to show various color or full shades of color, desired amounts of the colorants 34 and/or 36 are spread. As such, independent control of colorants 34, 36 with various grey scale is desirable for achieving full color states.

The clear optical state is achieved when the base/base salt functionalized colorants 34 and the acid/acid salt functionalized colorants 36 are compacted near respective electrodes 22, 20. First electrode 20 may be used to control the movement of colorants 36, and second electrode 22 may be used to control the movement of colorants 34. In the clear optical state of this example, a positive bias is applied to first electrode 20 and a negative bias is applied to second electrode 22 relative to a reference bias applied to the blanket electrode 28. The positive bias applied to first electrode 20 attracts negatively charged acid/acid salt functionalized colorants 36 to compact on the surface of first electrode 20 in some of the recesses 26. The negative bias applied to second electrode 22 attracts positively charged base/base salt functionalized colorants 34 to compact on the surface of second electrode 22 in other of the recesses 26. With colorant particles 34 and 36 compacted in respective recesses 26, the clear optical state is achieved.

To spread the base/base salt functionalized colorants 34 and achieve its color optical state, pulses may be applied to second electrode 22 and a positive bias may be applied to first electrode 20 relative to a reference bias applied to electrode 28. The pulses applied to second electrode 22 spread the positively charged base/base salt functionalized colorants 34 within display cell 30. The amount of spreading of the colorants 34 is controlled based on the pulses to provide a desired gray scale for the colorants 34. The positive bias applied to first electrode 20 attracts negatively charged acid/acid salt functionalized colorants 36 to compact on the surface of first electrode 20. With colorants 34 spread in display cell 30 and colorants 36 compacted in recesses 26 adjacent to the first electrode 20, a color optical state having the color of the base/base salt functionalized colorants 34 is achieved.

The voltages that are applied may vary depending, at least in part, on the colorants 34, 36 that are used and the desired color. The following are several examples of how the color optical state of the base/base salt functionalized colorants 34 can be achieved. In one example, the electrode 28 may be held at 0V while a steady +20 V is applied to electrode 20 and pulses of −20V and +5V are applied to electrode 22. The pulses are applied for 30 ms each. In another example, the electrode 28 may be held at +10V while a steady +20 V is applied to electrode 20 and pulses of −20V and +5V are applied to electrode 22. The pulses are applied for 30 ms each. In still another example, the electrode 28 may be held at −10V while a steady +20 V is applied to electrode 20 and pulses of −20V and +5V are applied to electrode 22. The pulses are applied for 30 ms each. Each of these examples results in compaction of the acid/acid salt functionalized colorants 36 and spreading of the base/base salt functionalized colorants 34. More particularly, each of these examples provides positive net bias to the electrode 20 while resulting in various potential to the electrode 22, which produces various grey levels. It is to be understood that appropriate voltage levels and pulse width combinations may be used to produce desired levels of grey for each of the colorant particles 34, 36, and thus desired color.

To spread the acid/acid salt functionalized colorants 36 and achieve its color optical state, pulses may be applied to first electrode 20 and a negative bias may be applied to second electrode 22 relative to a reference bias applied to electrode 28. The pulses applied to first electrode 20 spread the negatively charged acid/acid salt functionalized colorants 36 within display cell 30. The amount of spreading of colorants 36 is controlled based on the pulses to provide a desired gray scale for the colorants 36. The negative bias applied to second electrode 22 attracts positively charged base/base salt functionalized colorants 34 to compact on the surface of second electrode 22. With colorants 36 spread in display cell 30 and colorants 34 compacted in recesses 26 adjacent the second electrode 22, a color optical state having the color of the acid/acid salt functionalized colorants 36 is achieved.

The voltages that are applied may vary depending, at least in part, on the colorants 34, 36 that are used and the desired color. The following are several examples of how the color optical state of the acid/acid salt functionalized colorants 36 can be achieved. In one example, the electrode 28 may be held at 0V while a steady −20 V is applied to electrode 22 and pulses of 20V and −5V are applied to electrode 20. The pulses are applied for 30 ms each. In another example, the electrode 28 may be held at +10V while a steady −20 V is applied to electrode 22 and pulses of +20V and −5V are applied to electrode 20. The pulses are applied for 30 ms each. In still another example, the electrode 28 may be held at −10V while a steady −20 V is applied to electrode 22 and pulses of +20V and −5V are applied to electrode 20. The pulses are applied for 30 ms each. Each of these examples results in compaction of the base/base salt functionalized colorants 34 and spreading of the acid/acid salt functionalized colorants 36. More particularly, each of these examples provides negative net bias to the electrode 22 while resulting in various potential to the electrode 20, which produces various grey levels. As previously mentioned, appropriate voltage levels and pulse width combinations may be used to produce desired levels of grey for each of the colorant particles 34, 36, and thus desired color.

Figure 6:
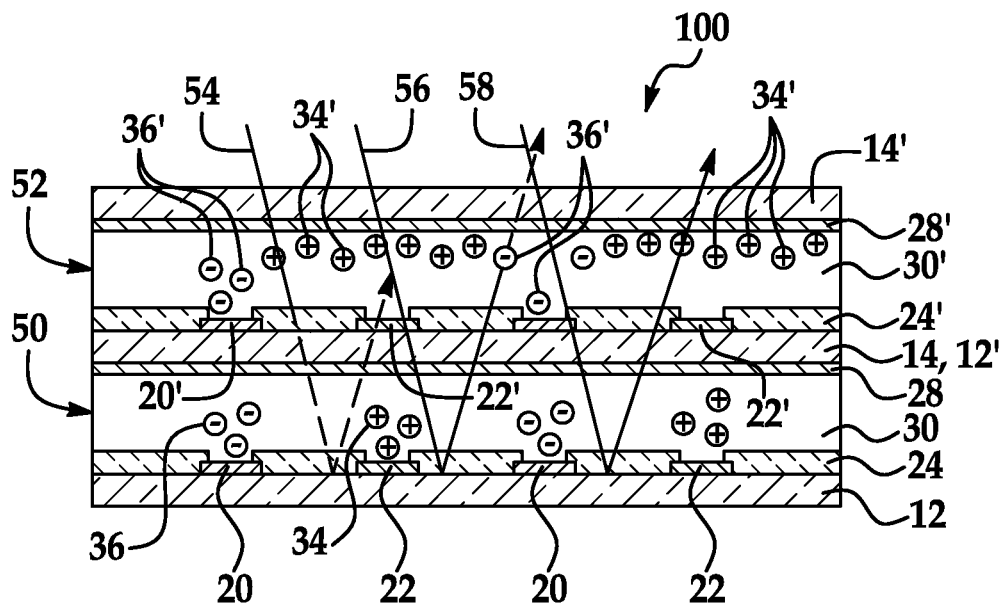
FIG. 6 is a cross-sectional view of an example of a display pixel including multiple layers.
Figure 7:
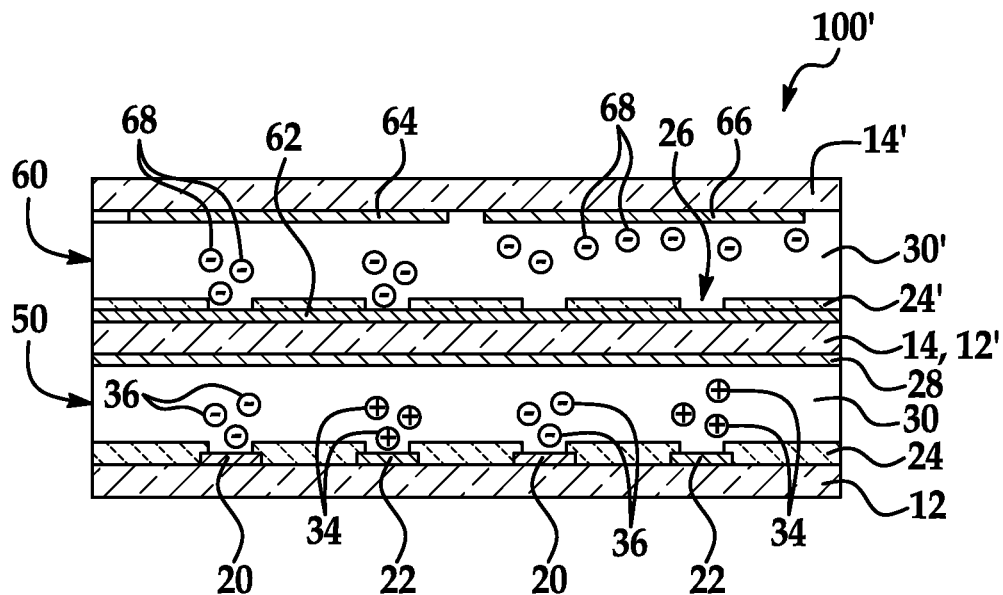
FIG. 7 is a cross-sectional view of another example of a display pixel including multiple layers.

The displays disclosed herein may be multi-layered systems 100, 100', such as those shown in FIGS. 6 and 7. A single pixel of the multi-layered systems 100, 100' is shown in these figures, and it is noted that the pixel walls 16, 18 are not shown.

FIG. 6 illustrates a cross-sectional view of one example a full color multi-layered pixel 100. This pixel 100 includes a dual layer stack including display element layers 50 and 52. Each layer 50 and 52 is similar to the single pixel 10 shown and described in reference to FIG. 3. In this example, the top substrate 14 of the first layer 50 is also the bottom substrate 12' of the second layer 52. The substrate 12 in this example may be reflective or may include a reflective layer (not shown). In one example, the reflective layer is white.

In this example, layer 50 includes a first dual color ink (e.g., positively charged magenta and negatively charged cyan), and layer 52 includes a second dual color ink (e.g., positively charged yellow and negatively charged black). This provides a full color (CMYK) display with a reduced number of backplanes compared to a single color ink in each layer, which will require three or more backplanes to produce full color.

The bias applied to electrodes 20 and 22 of the first layer 50 and to the electrodes 20' and 22' of the second layer 52 can be individually controlled as previously described. By controlling the bias applied to the electrodes 20, 22, 20', 22', the movement of the respective functionalized colorants 34, 36, 34', 36' of the first and second dual color inks of the multi-layered system 100 can be controlled to display desired colors, such as red (labeled 54), blue (labeled 56), and green (labeled 58) from appropriate combinations of subtractive colorant particles, such as cyan, magenta, and yellow.

FIG. 7 illustrates a cross-sectional view of another example a full color multi-layered pixel 100'. This pixel 100' includes a dual layer stack including display element layers 50 and 60. The layer 50 is similar to the single pixel 10 shown and described in reference to FIG. 3. In this example, layer 50 includes the dual color ink disclosed herein.

The top substrate 14 of the first layer 50 is also the bottom substrate 12' of the second layer 60. The substrate 12 in this example may be reflective or may include a reflective layer (not shown). In one example, the reflective layer is white.

The second layer 60 includes a single color ink (e.g., including negatively charged particles 68 or positively charged particles, not used in this example). Since a single color ink is utilized in this layer 60, the electrode scheme in this layer 60 can be different from the electrode scheme used when the dual color ink is included. In this example, the layer 60 includes an electrode 62 positioned adjacent to the substrate 14, 12'. A dielectric layer 24' is positioned over the electrode 62 to form recesses 26 so that portions of the electrode 62 are exposed, or at least are electrically active. The electrode 62 is a blanket electrode. The layer 60 also includes electrodes 64, 66 positioned adjacent to the substrate 14' and the display cell 30', and opposed to the electrode 62. It is to be understood that in one example, each of these electrodes 62, 64, 66 is a transparent electrode.

The blanket electrode 62 with the recessed dielectric layer 24' can provide electrokinetic control of particles 68 to compact or spread them, while a patterned electrode (e.g., having a finger-like configuration) with a blanket transparent electrode on the opposite side can provide electrophoretic control of the particles 68 (where the charged particles follow an electric field to compact or spread). Either configuration may be used for the single color.

The operation of the layer 60 will now be described. Both the clear optical state and the colored state for the layer 60 are shown in FIG. 7. To provide the clear optical state, a negative bias is applied to the electrode 64 relative to the reference bias applied to the electrode 62. With the negative bias applied to the electrode 64, negatively charged colorant particles 68 are attracted by the electrode 68 to compact in recesses 26. To provide the color or spread optical state as illustrated in another portion of display cell 30', a positive bias is applied to the electrode 66 relative to the reference bias applied to the electrode 62. With the positive bias applied to the electrode 66, the negatively charged colorant particles 68 are attracted by and spread over the electrode 66 or across the gap between the two electrodes, depending upon the voltage condition applies. The electrodes 64, 66 may be operated to provide a fully clear state, a fully colored state, or both states as shown in FIG. 7.

The layer 60 can be independently controlled from layer 50, and layer 50 may be controlled as previously described.

The ability to functionalize the pigment particle core surface in a desirable manner provides directive functionality, which allows many colorants to be made positive or negative. This enhances the color and charge combinations that may be used. Furthermore, the particular additive(s) disclosed herein unexpectedly introduced and/or enhanced both negative and positive charges within the ink, thus making the ink relatively easy to manufacture.

It is to be understood that the ranges provided herein include the stated range and any value or sub-range within the stated range. For example, a size ranging from about 0.1 wt % to about 20 wt % should be interpreted to include not only the explicitly recited amount limits of about 0.1 wt % to about 20 wt %, but also to include individual amounts, such as 5 wt %, 9.5 wt %, etc., and sub-ranges, such as about 3 wt % to about 11 wt, about 5 wt % to about 10 wt %, etc. Furthermore, when "about" is utilized to describe a value, this is meant to encompass minor variations (up to +/−5%) from the stated value.

While several examples have been described in detail, it will be apparent to those skilled in the art that the disclosed examples may be modified. Therefore, the foregoing description is to be considered non-limiting.

What is claimed is:

1. A dual color electronically addressable ink, comprising:
   a non-polar carrier fluid;
   a first colorant of a first color, the first colorant including:
      a first particle core; and
      a first functional group attached to a surface of the first particle core, the first functional group being capable of carrying a positive charge and being chosen from a base or a salt of the base;
   a second colorant of a second color that is different than the first color, the second colorant including:
      a second particle core; and
      a second functional group attached to a surface of the second particle core, the second functional group capable of carrying a negative charge and being chosen from an acid or a salt of the acid; and
   aromatic butyric acid, as an additive.

2. The dual color electronically addressable ink as defined in claim 1, further comprising polyisobutylene succinimide, polyhydroxystearic amide salt, and polyhydroxystearic acid as additional additives, wherein the ink includes:

the polyisobutylene succinimide present in an amount ranging from about 0.1 wt % to about 10 wt % of a total wt % of the ink;

the polyhydroxystearic amide salt present in an amount ranging from about 0.1 wt % to about 10 wt % of the total wt % of the ink;

the aromatic butyric acid present in an amount ranging from greater than 0 wt % to about 10 wt % of the total wt % of the ink; and the polyhydroxystearic acid present in an amount ranging from about 0.1 wt % to about 10 wt % of the total wt % of the ink.

3. The dual color electronically addressable ink as defined in claim 1 wherein each of the first colorant and the second colorant is independently selected from a magenta colorant, a cyan colorant, a black colorant, and a yellow colorant, and wherein the first color is different than the second color.

4. The dual color electronically addressable ink as defined in claim 3 wherein:

the first colorant is the magenta colorant;
the second colorant is the cyan colorant; and
the cyan colorant is extracted from an aqueous dispersion.

5. The dual color electronically addressable ink as defined in claim 1 wherein the first colorant and the second colorant are each present in an amount ranging from about 0.1 wt % to about 20 wt % of a total wt % of the ink.

6. The dual color electronically addressable ink as defined in claim 1 wherein the second functional group is selected from OH, SH, COOH, CSSH, COSH, $SO_3H$, $PO_3H$, $OSO_3H$, $OPO_3H$, salts thereof, and combinations thereof.

7. The dual color electronically addressable ink as defined in claim 1 wherein the first functional group is selected from trialkyamines, pyridines, substituted pyridines, imidazoles, substituted imidazoles, and $R_1R_2N$—, wherein $R_1$ and $R_2$ are each independently selected from a hydrogen group, a methyl group, an ethyl group, a propyl group, an isopropyl group, a butyl group, an iso-butyl group, an n-octyl group, an n-decyl group, an n-dodecyl group, an n-tetradecyl group, salts thereof, and combinations thereof.

8. A multi-layer system, comprising:

a first layer including the dual color electronically addressable ink as defined in claim 1; and a second layer including i) the dual color electronically addressable ink as defined in claim 1, wherein the first and second colors of the first layer are different than the first and second colors of the second layer, or ii) a single color electronically addressable ink, wherein the first and second colors of the first layer are different than a color of the second layer.

9. The multi-layer system as defined in claim 8, wherein the first layer and the second layer are part of a display device.

10. A method of making a dual color electronically addressable ink, comprising:

incorporating two different colored colorants into a non-polar carrier fluid, a first of the two different colored colorants being capable of carrying a positive charge and being functionalized with a base or a salt of the base, and a second of the two different colored colorants being capable of carrying a negative charge and being functionalized with an acid or a salt of the acid; and incorporating aromatic butyric acid an additive into the non-polar carrier fluid.

11. The method as defined in claim 10, further comprising incorporating polyisobutylene succinimide, polyhydroxystearic acid, and polyhydroxystearic amide salt as additional additives into the non-polar carrier fluid, wherein:

the polyisobutylene succinimide is incorporated in an amount ranging from about 0.1 wt % to about 10 wt % of a total wt % of the ink;

the polyhydroxystearic amide salt is incorporated in an amount ranging from about 0.1 wt % to about 10 wt % of the total wt % of the ink;

the polyhydroxystearic acid is incorporated in an amount ranging from about 0.1 wt % to about 10 wt % of the total wt % of the ink; and the aromatic butyric acid is incorporated in an amount ranging from greater than 0 wt % to about 10 wt % of the total wt % of the ink.

12. A method of making a dual color electronically addressable ink, comprising:

incorporating two different colored colorants into a non-polar carrier fluid, a first of the two different colored colorants being capable of carrying a positive charge and being functionalized with a base or a salt of the base, and a second of the two different colored colorants being capable of carrying a negative charge and being functionalized with an acid or a salt of the acid; and incorporating an additive into the non-polar carrier fluid, the additive being chosen from polyhydroxystearic amide salt, aromatic butyric acid, and combinations thereof;

wherein, prior to incorporating the two different colored colorants into the non-polar carrier fluid, the method further comprises:

diluting an aqueous dispersion containing the second of the two different colored colorants with water;

centrifuging the diluted aqueous dispersion to separate supernatant from sediment;

collecting the sediment;

adding water to the collected sediment to form a mixture;

freeze drying the mixture; and grinding the dried mixture to obtain the second of the two different colored colorants.

13. The method as defined in claim 12 wherein the incorporating steps are performed simultaneously.

* * * * *

UNITED STATES PATENT AND TRADEMARK OFFICE
CERTIFICATE OF CORRECTION

PATENT NO. : 8,652,245 B2
APPLICATION NO. : 13/234118
DATED : February 18, 2014
INVENTOR(S) : Qin Liu et al.

Page 1 of 1

It is certified that error appears in the above-identified patent and that said Letters Patent is hereby corrected as shown below:

In the Claims

In column 17, line 33, in Claim 7, delete "trialkyamines," and insert -- trialkylamines, --, therefor.

In column 18, line 8, in Claim 10, before "an" insert -- as --.

Signed and Sealed this
Fourteenth Day of October, 2014

Michelle K. Lee
*Deputy Director of the United States Patent and Trademark Office*